(12) United States Patent
Furtek

(10) Patent No.: US 7,516,109 B2
(45) Date of Patent: Apr. 7, 2009

(54) AUTOMATICALLY DERIVING LOGICAL, ARITHMETIC AND TIMING DEPENDENCIES

(76) Inventor: Frederick C. Furtek, 2470 Sharon Oaks Dr., Menlo Park, CA (US) 94025

( * ) Notice: Subject to any disclaimer, the term of this patent is extended or adjusted under 35 U.S.C. 154(b) by 109 days.

(21) Appl. No.: 11/265,998

(22) Filed: Nov. 2, 2005

(65) Prior Publication Data

US 2006/0167664 A1    Jul. 27, 2006

Related U.S. Application Data

(60) Provisional application No. 60/624,583, filed on Nov. 2, 2004.

(51) Int. Cl.
*G06F 17/00* (2006.01)
*G06F 17/10* (2006.01)
*G06F 11/00* (2006.01)

(52) U.S. Cl. .................................. 706/19; 714/741

(58) Field of Classification Search ................. 706/19; 714/741
See application file for complete search history.

(56) References Cited

U.S. PATENT DOCUMENTS

| | | | |
|---|---|---|---|
| 5,544,067 A * | 8/1996 | Rostoker et al. | 703/14 |
| 5,729,466 A | 3/1998 | Bamji | |
| 5,732,192 A * | 3/1998 | Malin et al. | 703/2 |
| 5,799,295 A * | 8/1998 | Nagai | 706/46 |
| 5,971,596 A | 10/1999 | Nishikawa | |
| 6,086,631 A | 7/2000 | Chaudhary et al. | |
| 6,820,068 B1 * | 11/2004 | Furtek | 706/45 |

FOREIGN PATENT DOCUMENTS

| | | |
|---|---|---|
| EP | 1297424 A | 2/2003 |
| WO | WO 02/25441 * | 3/2002 |

(Continued)

OTHER PUBLICATIONS

Debruyne, Romuald. "A strong local consistency for constraint satisfaction". 1999, IEEE Computer Society. Proceedings of the 11th International Conference on Tools with Artificial Intelligence. pp. 1-8.*

(Continued)

*Primary Examiner*—David R Vincent
*Assistant Examiner*—Nathan H Brown, Jr.
(74) *Attorney, Agent, or Firm*—Hickman Palermo Troung & Becker LLP

(57) ABSTRACT

A mechanism for verifying system behavior includes: (1) A "constraint-based inference engine" and (2) a "constraint-based simulator." The inference engine accepts logical/temporal/data dependencies describing a system implementation and automatically derives new logical/temporal/data dependencies describing the input/output ("black-box") behavior of the system or other aspect of the system's behavior. This capability means that a "behavioral model" can be automatically extracted from a "structural model," thereby supporting "encapsulation" and "information hiding." The simulator is driven by the output of the inference engine and behaves like a cycle-accurate simulator except that it can answer the question: Why does Signal S have Value V at Time T? This capability helps in system debugging since the simulator can immediately provide the user with the cause of an anomalous output value in the form of a behavioral constraint (implication) showing how the output value depends upon specific input values appearing in the simulation.

15 Claims, 15 Drawing Sheets

FOREIGN PATENT DOCUMENTS

WO      WO 0225441 A2     3/2002

OTHER PUBLICATIONS

Debruyne "A strong local consistency for constraint satisfaction". 1999 IEEE Computer Society. Proceedings of the 11th International Conference on Tools with Artificial Intelligence. pp. 1-8.*

Singh. "Path Consistency Revisited". 1995 Proceedings of hte 7th IEEE International Conference on Tools with Artificial Intelligence. pp. 318-325.*

Singh. "Path Consistency Revisited". 1995. IEEE. Proceedings of the 7th IEEE International Conference on Tools with Artificial Intelligence.*

Huijs, Corrie, "Design Correctness of Digital Systems," Euromicro Conference, Sweden, Aug. 25-27, 1998, XP010298054, pp. 30-33.

Huijs, Corrie, "A Graph Rewriting Approach for Transformational Design of Digital Systems," proceedings of the 22nd Euromicro Conference, 1996, XP002225042, pp. 177-184.

Bombana, Massimo, et al., "Design-Flow and Synthesis for ASICs: a case study," Proceedings of the Design Automation Conference, San Francisco, Jun. 12-16, 1995, XP000546342, pp. 292-297.

Copty, Fady et al., "Efficient Debugging in a Formal Verification Environment," Published online Feb. 21, 2003, International Journal of Software Tools for Technology Transfer, vol. 4, No. 3, May 2003, pp. 335-348, XP002422200.

International Searching Authority, "Notification of Transmittal of the International Search Report and the Written Opinion of the International Searching Authority, or the Declaration," PCT/US/039906, dated Mar. 9, 2007, 10 pages.

Current Claims, PCT/US039906, 1 Page (attached).

* cited by examiner

|  | time=0 | time=1 | time=2 | time=3 | time=4 | time=5 |
|---|---|---|---|---|---|---|
| InputA | 1251 True | 1252 False | 1253 True | 1254 True | 1255 False | 1256 False |
| InputB | 1257 7 | 1258 -5 | 1259 8 | 1260 1 | 1261 0 | 1262 -6 |
| InputC | 1263 -9 | 1264 0 | 1265 1 | 1266 4 | 1267 -3 | 1268 9 |
| OutputD | 1269 | 1270 | 1271 | 1272 | 1273 | 1274 |

FIG. 11(b)

|  | time=0 | time=1 | time=2 | time=3 | time=4 | time=5 |
|---|---|---|---|---|---|---|
| InputA | 1251<br>True | 1252<br>False | 1253<br>True | 1254<br>True | 1255<br>False | 1256<br>False |
| InputB | 1257<br>7 | 1258<br>-5 | 1259<br>8 | 1260<br>1 | 1261<br>0 | 1262<br>-6 |
| InputC | 1263<br>-9 | 1264<br>0 | 1265<br>1 | 1266<br>4 | 1267<br>-3 | 1268<br>9 |
| OutputD | 1269 | 1270<br>4 | 1271 | 1272<br>0 | 1273<br>-4 | 1274 |

AUTOMATICALLY DERIVING LOGICAL, ARITHMETIC AND TIMING DEPENDENCIES

RELATED APPLICATIONS

The present application claims priority to U.S. Provisional Application No. 60/624,583, "Torics: A New Paradigm for Formal Verification, Behavioral Modeling and Simulation", filed on Nov. 2, 2004 by Frederick C. Furtek, the contents of which are incorporated herein by reference.

The present application is related U.S. Pat. No. 6,820,068, "System and method for verifying logical, arithmetic and timing dependencies of system behaviors using constraint calculus analysis", filed as U.S. patent application Ser. No. 09/668,763 by Frederick C. Furtek on Sep. 22, 2000, the contents of which are incorporated herein by reference.

FIELD OF THE INVENTION

This present invention pertains generally to system verification. More particularly, the invention pertains to verifying system behavior using constraint-based analysis.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Digital (discrete-time) systems are well known in the art. In general, the design and verification of digital systems involve the complex interrelationship among logical, arithmetic and timing dependencies in the system. In particular, the input and output dependencies of such systems are of special interest.

Techniques for verifying discrete-time systems include simulation, emulation, debugging and formal verification. Simulation verification is a software solution wherein a software algorithm is programmed to carry out the functions of the discrete-time system. Using the simulation software, a user is able to construct a software version of the digital system under consideration. The simulation software normally provides an output signal, typically in the form of a graphical waveform. Upon providing the input to the simulator, the user is able to observe the output from the waveform signal produced by the simulator.

Emulation is a hardware solution for verifying the designs of digital systems. Emulation commonly involves the use of FPGA (Field-Programmable Gate Array) devices, a type of logic chip that can be programmed. An FPGA is capable of supporting thousands of gates. A user is able to set the potential connections between the logic gates of the FPGA. Using FPGA devices, the user is able to prototype the digital system under consideration for verifying the input/output dependencies of the system.

Debugging generally involves manually implementing and running the system design. If any problems result during execution, the user reverts to a previous step of the design process to ascertain the source of the problem. Once the user has made the necessary changes to the system design, the user again attempts to execute the system design to ascertain if there are any additional problems, and the process is repeated again.

There are several disadvantages associated with these verification techniques. First, simulation, emulation and debugging techniques are not exhaustive. That is, these techniques are, in general, not capable of completely verifying that a system design meets the behavioral requirements that are expected of it. In addition, there is the problem of "opaqueness." What a user gets from debugging, emulation and traditional simulation is a mass of data in the form of input vectors and output vectors, but there is no visibility into cause and effect. So a user faced with an anomalous output value must engage in a tedious and time consuming process to ferret out the cause(s) of that anomalous value.

Formal verification is another general approach to system verification. Three types of formal verification include (1) model checking, (2) theorem proving and (3) constraint-based analysis.

Model checking is popular within the research community but has not found widespread commercial use. That is primarily because a system is modeled as a finite-state machine, and this finite-state machine grows exponentially with the number of storage elements (flip flops). For example, a 10-flip-flop system requires a thousand (1,024) states, and a 20-flip-flop system requires a million (1,048,576) states. Since systems of practical interest often contain thousands of flip flops, "model-checking" approaches can be overwhelmed by the massive number of states.

Theorem proving is also popular within the research community, but—like model checking—has not found widespread commercial use. That is because the tools are not automated and require continual guidance by an expert in the field of theorem proving.

Constraint-based analysis as disclosed in U.S. Pat. No. 6,820,068 discloses a verification apparatus and method that is automated and also does not entail modeling a system as a finite-state machine, thereby avoiding the problems associated with the combinatorial explosion in states. However, U.S. Pat. No. 6,820,068 does not disclose an apparatus and method for automatically extracting the input/output ("black-box") behavior of a system. Nor can it tell a system designer who is faced with an anomalous output why Signal S has Value V at Time T.

Accordingly, there is a need for a mechanism for: (1) automatically extracting the input/output ("black-box") behavior of a system and (2) telling a system designer who is faced with an anomalous output why Signal S has Value V at Time T.

BRIEF DESCRIPTION OF THE DRAWINGS

FIG. 11(b) depicts an illustrative initial matrix (simulation) created from constraint graph G of FIG. 11(a) and a set of input vectors according to an embodiment of the present invention.

FIG. 11(c) depicts an illustrative final matrix (simulation) created from constraint graph G of FIG. 11(a) and a set of input vectors according to an embodiment of the present invention.

DETAILED DESCRIPTION

Figure 1:
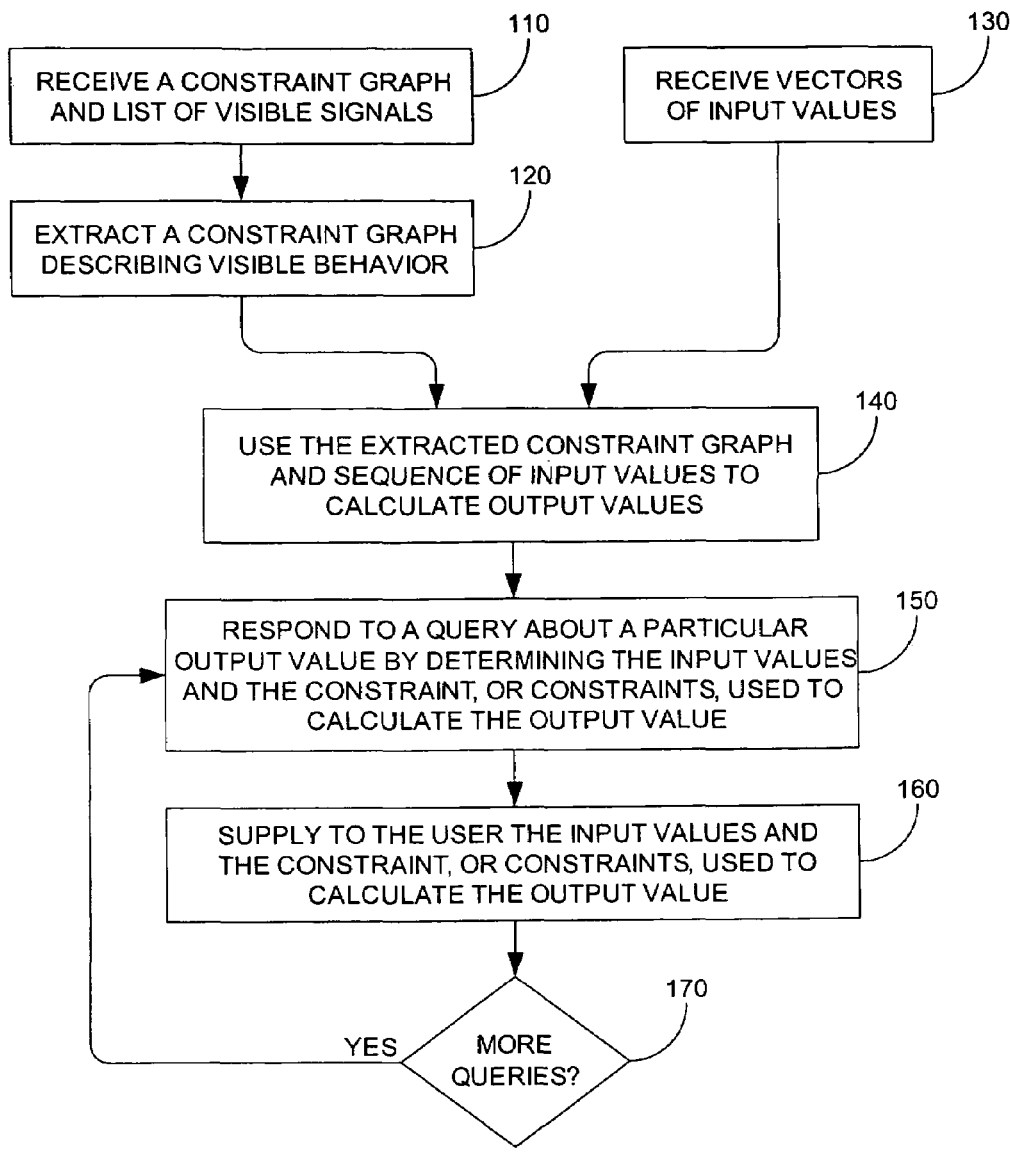
FIG. 1 is a flow chart showing generally the operations associated with using a constraint-based simulator according to an embodiment of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block-diagram form in order to avoid unnecessarily obscuring the present invention.

Overview

Embodiments of the present invention are described for (1) automatically extracting the input/output ("black-box") behavior of a system, (2) "deducing" output values in a simulation of the system and (3) determining in a simulation of the system why output Signal S has Value V at Time T. The mechanism may be used in such application areas as electronics, digital logic, signal processing, protocols, hardware/software codesign, computer security, mechanical engineering, biology, economics and finance, among others.

A "system behavior" is defined as a sequence of states that is either allowed (permitted/possible) or disallowed (prohibited/forbidden/impossible). A "behavioral constraint" is defined as a product (conjunction) of Boolean formulas distributed over time that is satisfied only by disallowed behaviors. As opposed to finite-state machines which indicate possible or allowed behavior such as possible state sequences, behavioral constraints indicate what cannot happen (i.e., disallowed behavior).

There are three principal advantages to dealing with disallowed patterns of behavior: (1) many complex logical, arithmetic and timing dependencies are more conveniently/succinctly expressed in terms of disallowed behaviors, (2) the state-space explosion of state-machine approaches is largely avoided and (3) there are powerful verification techniques that are suited only to disallowed patterns of behavior.

An embodiment of the present invention comprises an inference engine and a constraint-based simulator. The inference engine receives two inputs: (1) a constraint graph describing the disallowed behaviors of a system and (2) a list of those system signals that the user is interested in determining dependencies among. These "visible signals" are typically associated with system input and outputs, but may in fact be any subset of signals of the user's choosing. In an alternative embodiment, the user may supply the inference engine with a list of non-visible or "hidden" signals—that is, those signals that the user does not wish to appear in the constraint graph produced by the inference engine.

The inference engine transforms the received constraint graph into a new constraint graph whose accepted constraints represent dependencies among just the visible signals. This transformation is accomplished by "resolving" and "deleting" paths in a series of constraint graphs, starting with the received constraint graph, via each of the non-visible signals.

The resolution operation of the preferred embodiment is a generalization of Boolean resolution. Boolean resolution comes in two forms: conjunctive and disjunctive. The conjunctive form is applied to a Boolean product of sums, while the disjunctive form—which is sometimes called consensus—is applied to a Boolean sum of products. An embodiment of the present invention uses the disjunctive form. In the Boolean case, two Boolean expressions are resolved via a literal that appears complemented in one Boolean expression and non-complemented in the other Boolean expression. The result of resolving two Boolean expressions is a third Boolean expression. In our preferred embodiment, two equal-length paths in a constraint graph are resolved via a signal to produce, or "infer", a new path which is added to the constraint graph. (A generalized form of Boolean resolution can be applied to more than two Boolean expressions. Similarly, one skilled in the art will appreciate that a generalized form of "sequential resolution" can be applied to more than two equal-length paths in a constraint graph.)

The process of resolving paths in a constraint graph is similar to the process of resolving links as described in U.S. Pat. No. 6,820,068. In both cases, two Boolean formulas are resolved via a signal. In an embodiment of the present invention, however, these two resolved Boolean formulas each label an arc in the constraint graph. Moreover, these two arcs are contained in two equal-length paths within the constraint graph, and it is these two paths that are used to infer a new path which is the same length as the first two paths and which is added to the constraint graph.

The process of deleting paths within a constraint graph via a signal S comprises two steps: (1) deleting all arcs in the constraint graph that are labeled with a Boolean formula that mentions signal S and (2) deleting all arcs in the resulting graph that are no longer on a path from an original initial node of the constraint graph to an original terminal node of the constraint graph.

The graph that results from "resolving" and "deleting" paths via each of the non-visible signals yields a new graph with two important properties: (1) Like the received graph, the resultant graph is a constraint graph—that is, each of the sequences of Boolean formulas accepted by the resultant graph describes a disallowed pattern of behavior. (2) The resultant graph mentions only visible signals and characterizes the "visible behavior" of the system. This capability means that a "behavioral model" can be automatically extracted from a "structural model," thereby supporting "encapsulation" and "information hiding." This behavioral model can be stored for reuse in generating behavioral models of larger structures, or it can be supplied to a constraint-based simulator.

The constraint-based simulator behaves like a conventional cycle-accurate simulator, except that it can answer the question: Why does Signal S have Value V at Time T? This capability is extraordinarily helpful in system debugging since the simulator can immediately provide the user with the cause of an anomalous output value in the form of a behavioral constraint (implication) showing how the output value depends upon specific input values appearing in the simulation.

In addition to a constraint graph, the simulator also receives vectors of input values for selected visible signals. Together, the constraint graph and the vectors of input values are used to calculate the values of other signals, typically output signals. For example, suppose that <(InputA=True), (OutputC=InputB+8)> is a constraint accepted by the constraint graph supplied to the simulator. This constraint can be interpreted as the implication: If InputA=True at time t, then the value of OutputC at time t+1 is InputB+8. Suppose further that the input values supplied to the simulator indicate that InputA=True at time t=100 and that InputB=5 at time t=101. The simulator uses this information to deduce that OutputC=13 at time t=101. If the user should then query the simulator about why OutputC=13 at time t=101, then the simulator will return the above constraint, or equivalent implication, and will indicate that InputA=True at time t=100 and that InputB=5 at time t=101.

DETAILED DESCRIPTION OF ILLUSTRATIVE EMBODIMENTS

Figure 4:
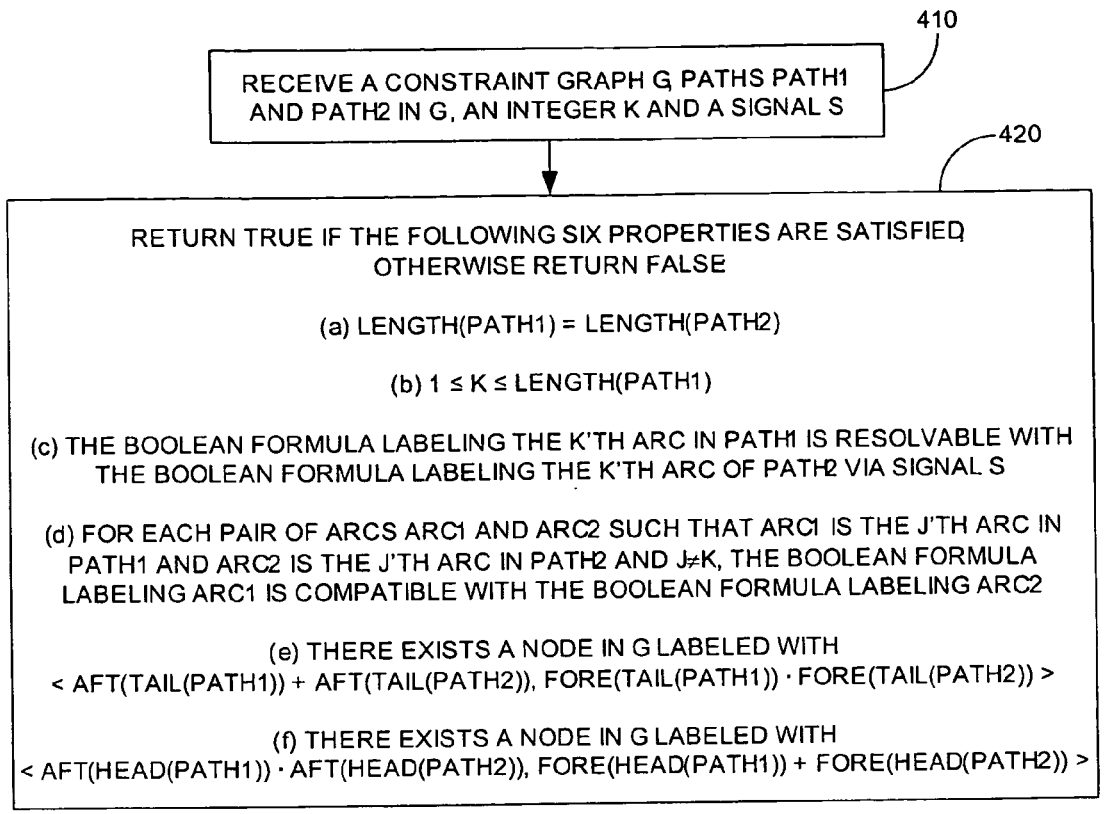
FIG. 4 is a flow chart showing generally the operations associated with determining whether two paths in a constraint graph are "resolvable" according to an embodiment of the present invention.
Figure 5:
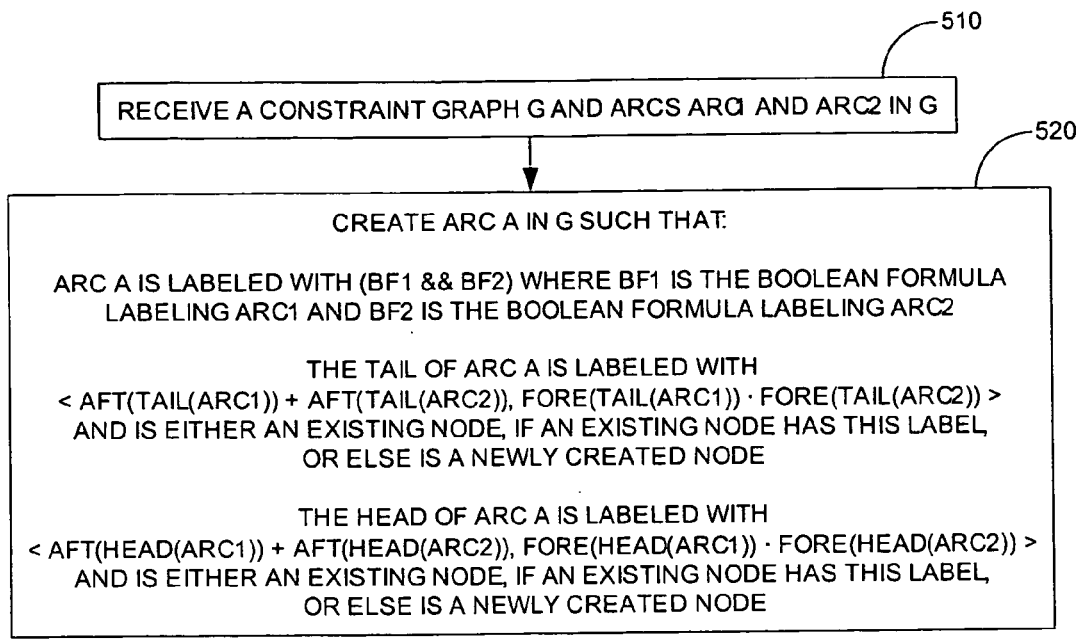
FIG. 5 is a flow chart showing generally the operations associated with creating a "predecessor arc" according to an embodiment of the present invention.

Referring more specifically to the drawings, for illustrative purposes embodiments of the present invention as embodied in the apparatus shown in FIG. 5 of U.S. Pat. No. 6,820,068 and the procedure outlined in FIG. 1 through FIG. 7, FIG. 9 and FIG. 10 above. An embodiment of the present invention is disclosed generally in terms of a system and procedure for verifying system behaviors, although numerous other uses will suggest themselves to persons of ordinary skill in the art.

FIG. 1 generally depicts a "top-level" view of a procedure in which a constraint graph describing visible behavior is extracted from an input constraint graph and then used to drive a constraint-based simulator with the ability to answer queries about the causes of particular output values. At box 110, the procedure receives a constraint graph and a list of "visible signals." These signals are typically associated with system input and outputs, but may in fact be any subset of signals of the user's choosing. It is values associated with these signals, and only these signals, that appear in simulations produced by the constraint-based simulator. In an alternative embodiment, the user may supply the procedure with a list of non-visible or "hidden" signals—that is, those signals that the user does not wish to appear in simulations produced by the constraint-based simulator.

Box 120 shows the operation of extracting a constraint graph describing visible behavior from an input constraint graph. This operation is described in detail in FIG. 2 through FIG. 7. At box 130, the procedure receives vectors of input values for selected visible signals, typically signals associated with system inputs. At box 140, the constraint-based simulator uses the "visible constraint graph" and the vectors of input values to deduce values for various visible signals, typically signals associated with system outputs. At box 150, the simulator responds to a query about a particular output value by determining the input value, or values, and constraint, or constraints, used to calculate that output value. At box 160, the input values and constraint, or constraints, used to calculate that output value are supplied to the user. At box 170, control returns to box 150 if there are more queries to be processed.

Figure 2:
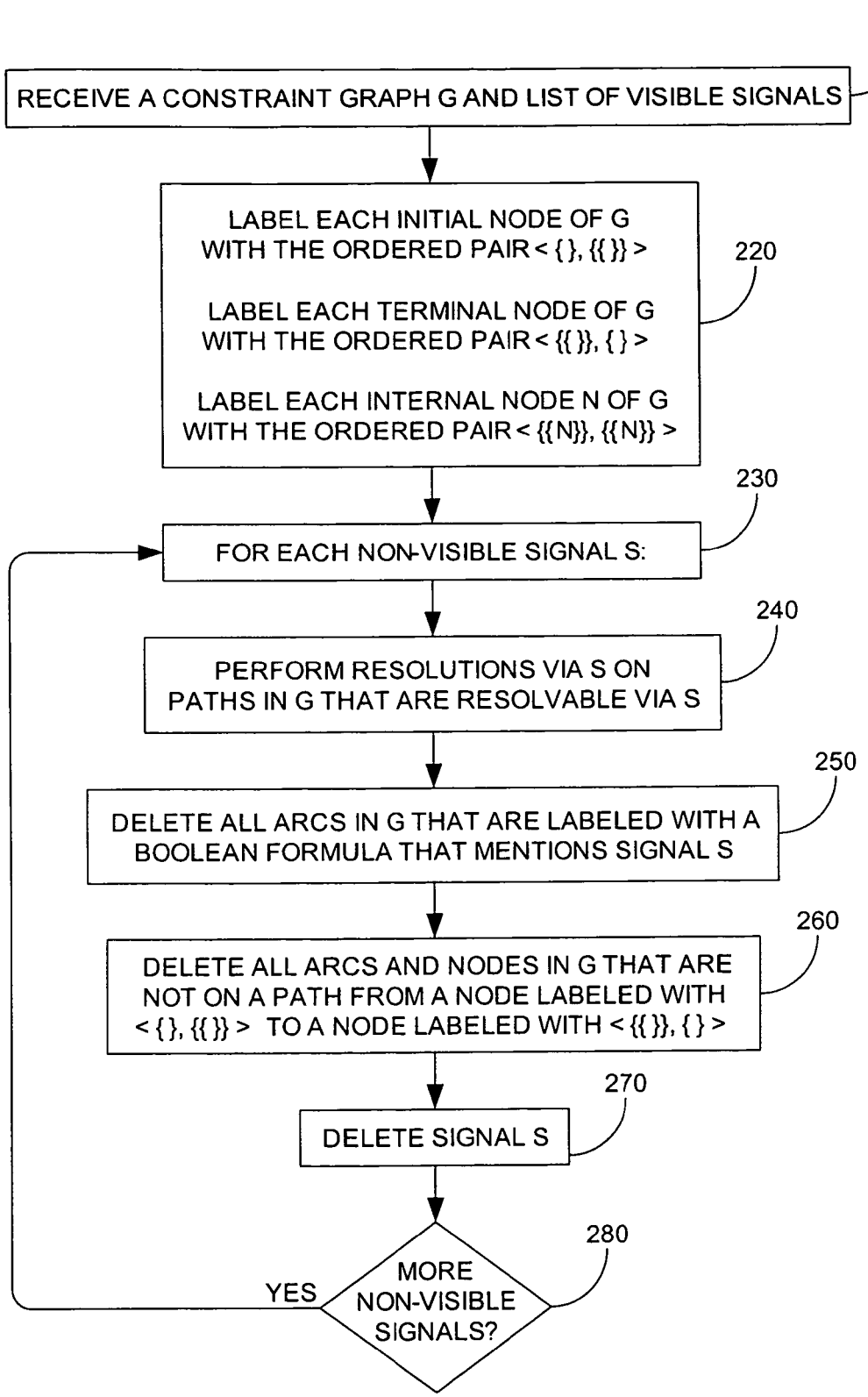
FIG. 2 is a flow chart showing generally the operations associated with extracting a constraint graph that describes a system's visible behavior according to an embodiment of the present invention.

FIG. 2 shows the operations performed by the inference engine in extracting a constraint graph describing visible behavior from an input constraint graph. At box 210, the procedure receives a constraint graph G and a list of "visible signals." Box 220 lists the operations necessary to prepare G for the "sequential resolutions" that follow. In this initialization phase, each node of G is labeled with an ordered pair <aft, fore> where aft and fore are each a set of sets of node names of G. More specifically, each initial node of G—a node with no incoming arcs—is labeled with the ordered pair <{ }, {{ }}> where { } is the empty set and {{ }} is the set containing just the empty set. Each terminal node of G—a node with no outgoing arcs—is labeled with the ordered pair <{{ }}, { }> where { } is the empty set and {{ }} is the set containing just the empty set. Finally, each internal (non-initial, non-terminal) node n of G is labeled with <{{n}}, {{n}}>.

"Resolutions" and "deletions" are then performed for each non-visible signal S as depicted in boxes 230 through 280. These operations are performed on a succession of constraint graphs starting with the graph produced by the operations in box 220. At box 240, paths within the current constraint graph are resolved via signal S, provided that they are resolvable by S. Each such "sequential resolution" produces a new path which is added to the current constraint graph. At the user's direction, the procedure may perform either all possible resolutions via S or only those resolutions meeting certain criteria as supplied by the user. FIG. 3 through FIG. 7 provide further details on sequential resolution.

Boxes 250 through 270 illustrate deletion. At box 250, all arcs in the current constraint graph that are labeled with a Boolean formula mentioning signal S are deleted. At box 260, all "dangling arcs" and "dangling nodes"—those arcs and nodes no longer on a path from a node labeled with <{ }, {{ }}> to a node labeled with <{{ }}, { }>—are deleted. At box 270, all references to Signal S in the current constraint graph are deleted.

At box 280, control returns to box 230 until all non-visible signals have been "resolved" and "deleted." Note that although not illustrated in FIG. 2, the procedure may optionally perform sequential resolutions via visible signals, but in this case, there are no associated deletions.

Figure 3:
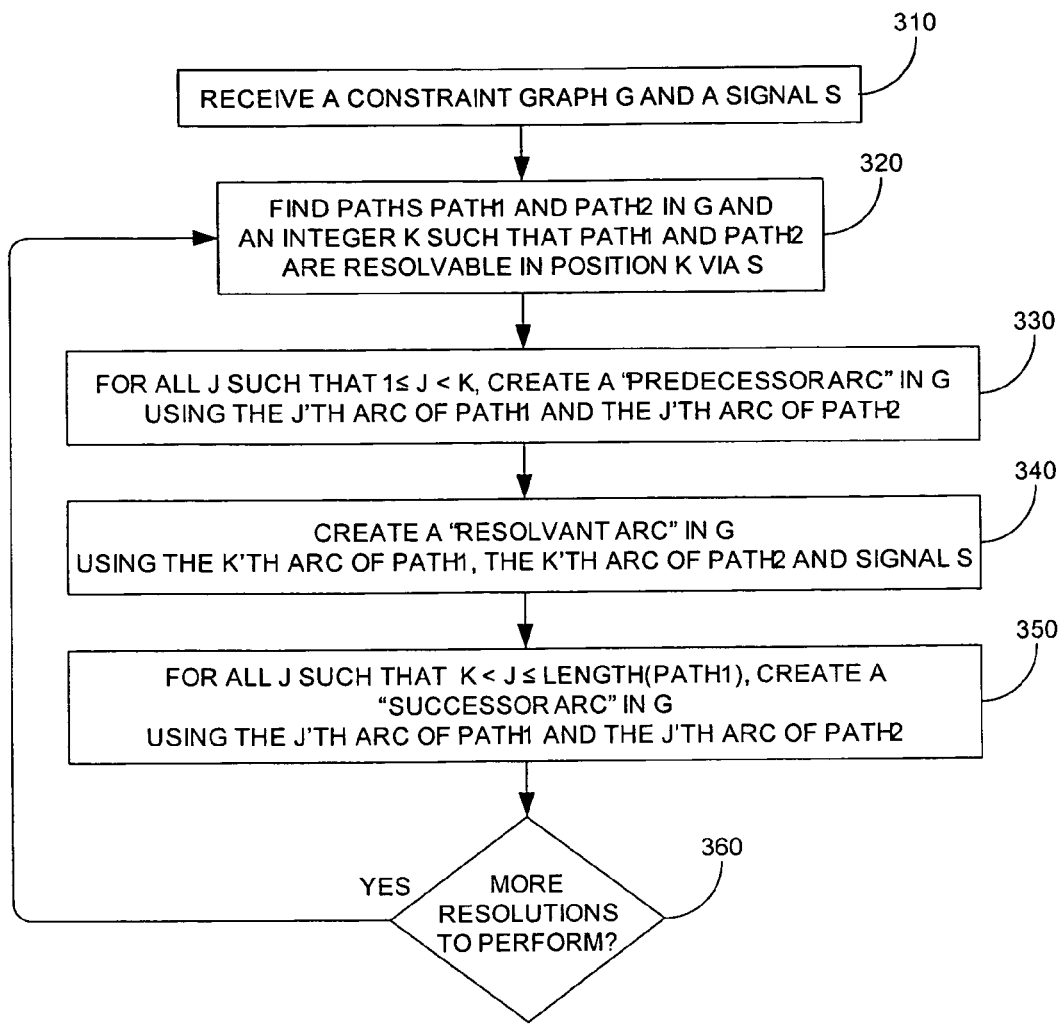
FIG. 3 is a flow chart showing generally the operations associated with "resolving" two paths in a constraint graph according to an embodiment of the present invention.

FIG. 3 generally depicts the operations involved in performing sequential resolutions, which is referenced above in box 240 of FIG. 2. At box 310, the procedure receives a constraint graph G and a signal S. Box 320 depicts the operation of finding paths Path1 and Path2 in G and an integer K such that Path1 and Path2 are resolvable in position K via S, where resolvability is as defined in FIG. 4. (It will be apparent to those skilled in the art that there are various procedures for finding a Path1, Path2 and K meeting the resolvability requirement.)

Box 330 depicts the operation of creating a "predecessor arc" in G using the J'th arc of Path1 and the J'th arc of Path2 for all J such that $1 \leq J < K$. This operation is described in detail in FIG. 5. Box 340 depicts the operation of creating a "resolvant arc" in G using the K'th arc of Path1 and the K'th arc of Path2. This operation is described in detail in FIG. 6. Box 350 depicts the operation of creating a "successor arc" in G using the J'th arc of Path1 and the J'th arc of Path2 for all J such that K<J≦Length(Path1), where Length(Path1) is the number of arcs in Path1. This operation is described in detail in FIG. 7. At box 360, control returns to box 320 if there are additional sequential resolutions to be formed.

FIG. 4 illustrates the operations involved in determining whether two paths in a constraint graph are resolvable in position K via a signal S, which is referenced above in box 320 of FIG. 3. At box 410, the procedure receives a constraint graph G, two paths—Path1 and Path2—in G, an integer K and a signal S. At box 420, the procedure returns True if properties 420(a), 420(b), 420(c), 420(d), 420(e) and 420(f) are all satisfied. Otherwise, the procedure returns false.

Property 420(a) requires that the lengths of Path1 and Path2 be the same—that is, the number of arcs in Path1 and in Path2 must be the same.

Property 420(b) requires that 1≦K≦Length(Path1). In other words, the integer K must be greater than or equal to 1 but less than or equal to the length of Path1.

Property 420(c) requires that the Boolean formula labeling the K'th arc in Path1 and the Boolean formula labeling the K'th arc of Path2 be "resolvable" via Signal S. Two Boolean formulas, BF1 and BF2, are resolvable via Signal S if and only if: (1) there exists a condition C1 appearing in BF1 and a condition C2 appearing in BF2 such that C1 and C2 are resolvable via S as defined in U.S. Pat. No. 6,820,068 and (2) the Boolean formulas BF1(C1=True) and BF2(C2=True) are "compatible," where BF1(C1=True) is the Boolean formula obtained when each occurrence of C1 in BF1 is set to True and BF2(C2=True) is the Boolean formula obtained when each occurrence of C2 in BF2 is set to True. Two Boolean formulas BF3 and BF4 are compatible if and only if the set of system states in which (BF3 && BF4)—where && denotes Boolean conjunction (AND)—holds is non-empty. In other words, there exists at least one system state in which both BF3 and BF4 hold (are true).

Property 420(d) requires that for each pair of arcs Arc1 and Arc2 such that Arc1 is the J'th arc in Path1 and Arc2 is the J'th arc in Path2 and J is not equal to K, the Boolean formula labeling Arc1 is compatible with the Boolean formula labeling Arc2.

Property 420(e) requires that there exist a node in G labeled with the ordered pair <Aft(Tail(Path1))+Aft(Tail(Path2)), Fore(Tail(Path1))·Fore(Tail(Path2))> where Tail(P) denotes the tail (initial endpoint) of path P, Aft(n) denotes the first element of the ordered pair labeling node n, Fore(n) denotes the second element of the ordered pair labeling node n, "+" denotes the Sum of two sets of sets as defined in U.S. Pat. No. 6,820,068 and "·" denotes the Product of two sets of sets as defined in U.S. Pat. No. 6,820,068.

Property 420(f) requires that there exists a node in G labeled with the ordered pair <Aft(Head(Path1))·Aft(Head(Path2)), Fore(Head(Path1))+Fore(Head(Path2))> where Head(P) denotes the head (terminal endpoint) of path P, Aft(n) is as previously defined, Fore(n) is as previously defined, "+" is as previously defined and "·" is as previously defined.

FIG. 5 is a flow chart showing generally the operations associated with creating a "predecessor arc" in a constraint graph, which is referenced above in box 330 of FIG. 3. At box 510, the procedure receives a constraint graph G and arcs Arc1 and Arc2 in G. At box 520, the procedure creates a prospective new arc A in G using Arc1 and Arc2. This arc is labeled with the Boolean formula (BF1 && BF2) where BF1 is the Boolean formula labeling Arc1, BF2 is the Boolean formula labeling Arc2 and "&&" denotes Boolean conjunction (AND). The tail (initial endpoint) of arc A is a node labeled with the ordered pair <Aft(Tail(Arc1))+Aft(Tail(Arc2)), Fore(Tail(Arc1))·Fore(Tail(Arc2))> where Tail(A) denotes the tail (initial endpoint) of an arc A, Aft(n) is as previously defined, Fore(n) is as previously defined, "+" is as previously defined and "·" is as previously defined. The tail of A is either an existing node, if an existing node has this label, or else is a newly created node. The head (terminal endpoint) of arc A is a node labeled with the ordered pair <Aft(Head(Arc1))+Aft(Head(Arc2)), Fore(Head(Arc1))·Fore(Head(Arc2))> where Head(A) denotes the head (terminal endpoint) of an arc A, Aft(n) is as previously defined, Fore(n) is as previously defined, "+" is as previously defined and "·" is as previously defined. The head of A is either an existing node, if an existing node has this label, or else is a newly created node. Arc A is added to G provided that there is not a pre-existing arc in G that is identical to A. If there is a pre-existing arc in G that is identical to arc A, then the prospective arc A is discarded and the constraint graph G is left unchanged.

Figure 6:
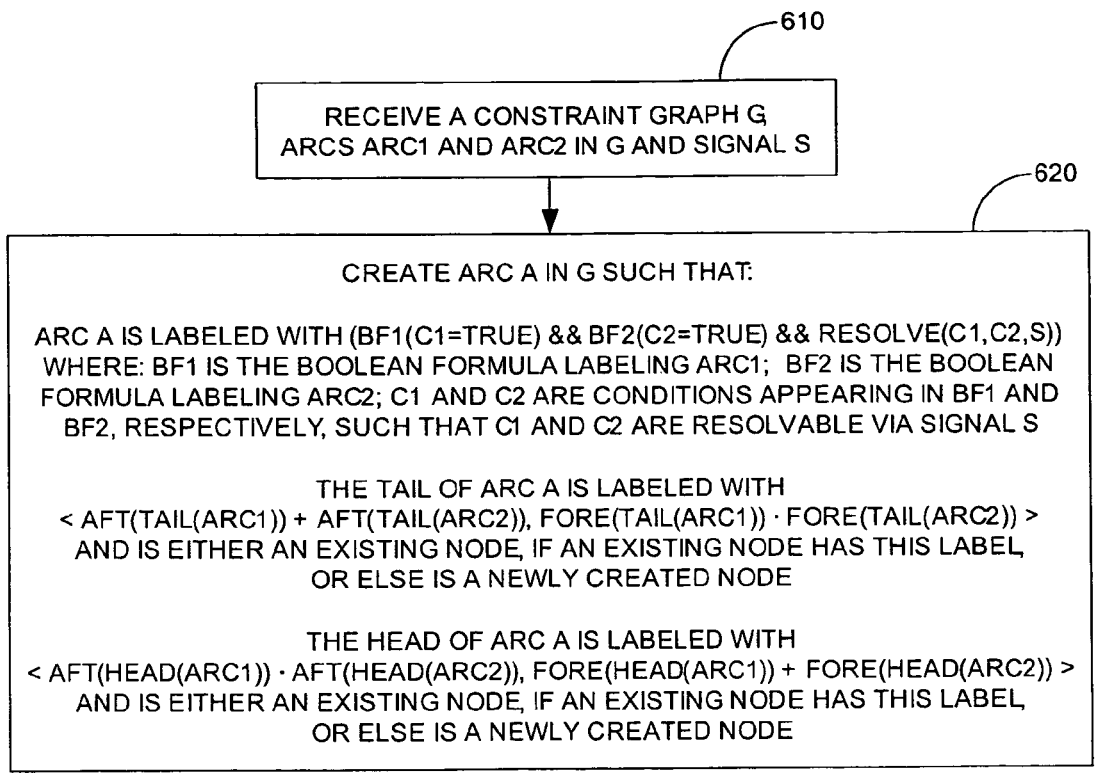
FIG. 6 is a flow chart showing generally the operations associated with creating a "resolvant arc" according to an embodiment of the present invention.
Figure 7:
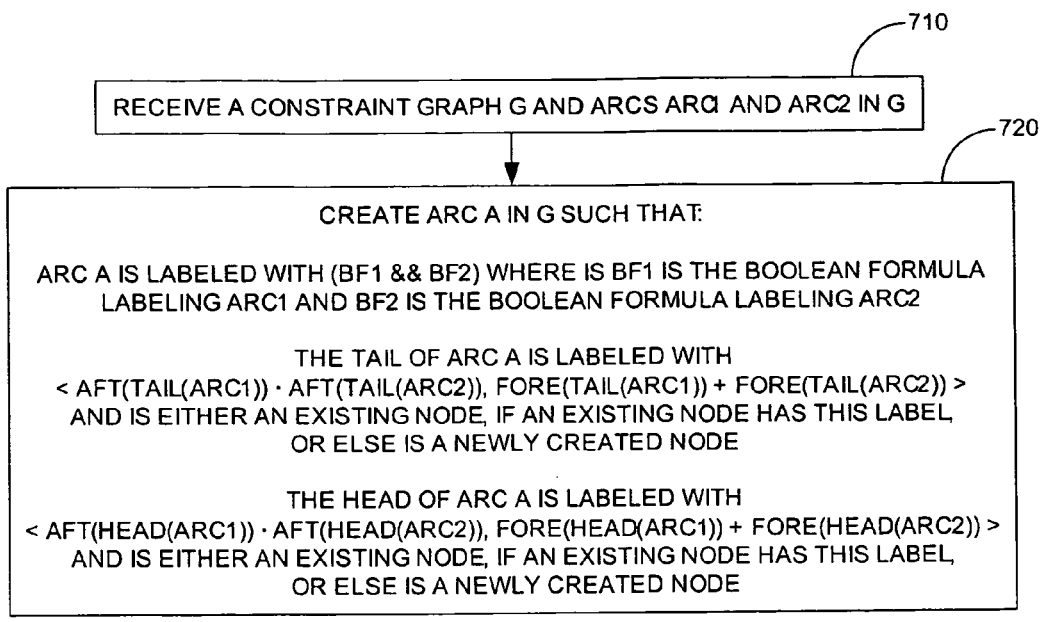
FIG. 7 is a flow chart showing generally the operations associated with creating a "successor arc" according to an embodiment of the present invention.

FIG. 6 is a flow chart showing generally the operations associated with creating a "resolvant arc" in a constraint graph, which is referenced above in box 340 of FIG. 3. At box 610, the procedure receives a constraint graph G and arcs Arc1 and Arc2 in G. At box 620, the procedure creates a prospective new arc A in G using Arc1 and Arc2. This arc is labeled with the Boolean formula $$BF1(C1{=}True) \,\&\&\, BF2(C2{=}True) \,\&\&\, Resolve(C1, C2, S)$$

where: BF1 is the Boolean formula labeling Arc1; BF2 is the Boolean formula labeling Arc2; C1 and C2 are conditions appearing in BF1 and BF2, respectively, such that C1 and C2 are resolvable via signal S as defined in U.S. Pat. No. 6,820,068; BF1(C1=True) and BF2(C2=True) are compatible Boolean formulas as defined above; Resolve(C1,C2,S) is as illustrated in U.S. Pat. No. 6,820,068; and "&&" denotes Boolean conjunction (AND). The tail (initial endpoint) of arc A is a node labeled with the ordered pair <Aft(Tail(Arc1))+Aft(Tail(Arc2)), Fore(Tail(Arc1))·Fore(Tail(Arc2))> where Tail(A) is as previously defined, Aft(n) is as previously defined, Fore(n) is as previously defined, "+" is as previously defined and "·" is as previously defined. The tail of A is either an existing node, if an existing node has this label, or else is a newly created node. The head (terminal endpoint) of arc A is a node labeled with the ordered pair <Aft(Head(Arc1))·Aft(Head(Arc2)), Fore(Head(Arc1))+Fore(Head(Arc2))> where Head(A) is as previously defined, Aft(n) is as previously defined, Fore(n) is as previously defined, "+" is as previously defined and "·" is as previously defined. The head of A is either an existing node, if an existing node has this label, or else is a newly created node. Arc A is added to G provided that there is not a pre-existing arc in G that is identical to A. If there is a pre-existing arc in G that is identical to arc A, then the prospective arc A is discarded and the constraint graph G is left unchanged. HCx FIG. 7 is a flow chart showing generally the operations associated with creating a "successor arc" in a constraint graph, which is referenced above in box 350 of FIG. 3. At box 710, the procedure receives a constraint graph G and arcs Arc1 and Arc2 in G. At box 720, the procedure creates a prospective new arc A in G using Arc1 and Arc2. This arc is labeled with the Boolean formula (BF1 && BF2) where BF1 is the Boolean formula labeling Arc1, BF2 is the Boolean formula labeling Arc2 and "&&" denotes Boolean conjunction (AND). The tail (initial endpoint) of arc A is a node labeled with the ordered pair <Aft(Tail(Arc1))·Aft(Tail(Arc2)), Fore(Tail(Arc1))+ Fore(Tail(Arc2))> where Tail(A) is as previously defined, Aft(n) is as previously defined, Fore(n) is as previously defined, "+" is as previously defined and "·" is as previously defined. The tail of A is either an existing node, if an existing node has this label, or else is a newly created node. The head (terminal endpoint) of arc A is a node labeled with the ordered pair <Aft(Head(Arc1))·Aft(Head(Arc2)), Fore(Head (Arc1))+Fore(Head(Arc2))> where Head(A) is as previously defined, Aft(n) is as previously defined, Fore(n) is as previously defined, "+" is as previously defined and "·" is as previously defined. The head of A is either an existing node, if an existing node has this label, or else is a newly created node. Arc A is added to G provided that there is not a pre-existing arc in G that is identical to A. If there is a pre-existing arc in G that is identical to arc A, then the prospective arc A is discarded and the constraint graph G is left unchanged.

Figure 8A:
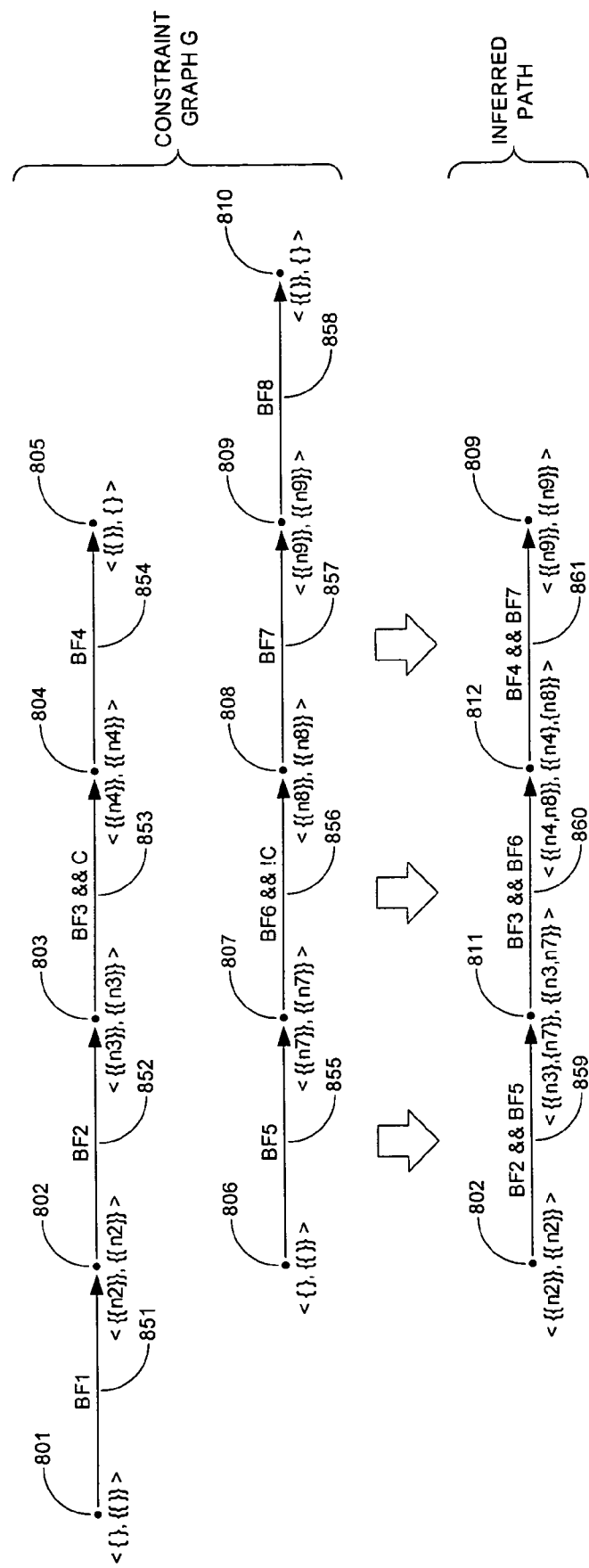
FIG. 8(a) depicts an illustrative constraint graph G and an illustrative "inferred path" according to an embodiment of the present invention.

FIG. 8(a) depicts an example of a constraint graph G labeled in accordance with box 220 of FIG. 2 and a path inferred from that graph in accordance with the operations described in FIG. 3 through FIG. 7. G comprises nodes 801, 802, 803, 804, 805, 806, 807, 808, 809 and 810, and arcs 851, 852, 853, 854, 855, 856, 857 and 858. Nodes 801 and 806 are initial nodes of G and both are labeled with the ordered pair <{ }, {{ }}> in accordance with box 220 of FIG. 2. Nodes 805 and 810 are terminal nodes of G and both are labeled with the ordered pair <{{ }}, { }> in accordance with box 220 of FIG. 2. Nodes 802, 803, 804, 807, 808 and 809 are internal nodes of G, and their "names" are n2, n3, n4, n7, n8 and n9, respectively. Thus in accordance with box 220 of FIG. 2, node 802 is labeled with the ordered pair <{{n2}},{{n2}}>, node 803 is labeled with the ordered pair <{{n3}},{{n3}}>, node 804 is labeled with the ordered pair <{{n4}}, {{n4}}>, node 807 is labeled with the ordered pair <{{n7}}, {{n7}}>, node 808 is labeled with the ordered pair <{{n8}}> and node 809 is labeled with the ordered pair <{{n9}},{{n9}}>.

In accordance with boxes 320 through 350 in FIG. 3, Path1 and Path2 in constraint graph G are resolved to yield the inferred path. Path1 is the path in G originating at node 802, terminating at node 805 and comprising the arcs 852, 853 and 854. Its length is 3. Path2 is the path in G originating at node 806, terminating at node 809 and comprising the arcs 855, 856 and 857. Its length is also 3 in accordance with requirement 420(a) in FIG. 4.

The inferred path originates at node 802, which is a node in G in accordance with requirement 420(e) in FIG. 4. The inferred path terminates at node 809, which is a node in G in accordance with requirement 420(f) in FIG. 4. The inferred path comprises the "predecessor arc" 859, the "resolvant arc" 860 and the "successor arc" 861. Arc 859 is derived from arc 852 and arc 855 in accordance with box 330 in FIG. 3 and box 520 in FIG. 5. Arc 861 is derived from arc 854 and arc 857 in accordance with box 350 in FIG. 3 and box 720 in FIG. 7. Arc 860 is derived from arc 853 and arc 856 in accordance with box 340 in FIG. 3 and box 620 in FIG. 6. In the example: Boolean formula (BF3 && C) corresponds to Boolean formula BF1 referenced in box 620; Boolean formula (BF6 && !C)—where "!" denotes Boolean negation (NOT)—corresponds to Boolean formula BF2 referenced in box 620; Condition C corresponds to Condition C1 referenced in box 620; Condition !C corresponds to Condition C2 referenced in box 620; True corresponds to Resolve(C1,C2, S) referenced in box 620; and (BF3 && BF6) corresponds to (BF1(C1=True) && BF2(C2=True) && Resolve(C1,C2,S)) referenced in box 620.

Figure 8B:
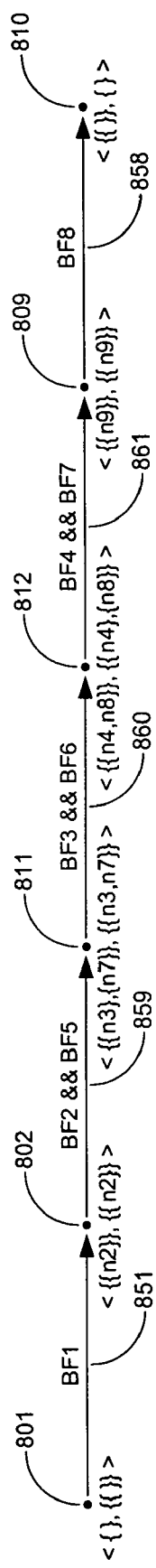
FIG. 8(b) depicts the result of deleting signal S in the constraint graph obtained by adding the inferred path of FIG. 8(a) to constraint graph G of FIG. 8(a) according to an embodiment of the present invention.

FIG. 8(b) depicts the result of "deleting" signal S in the constraint graph obtained by adding the inferred path of FIG. 8(a) to constraint graph G of FIG. 8(a). This deletion assumes that the only mention of signal S in G is in condition C that appears in the Boolean formulas labeling arcs 853 and 856. The operations involved in deleting signal S comprise deleting arcs 853 and 856 in accordance with box 250 of FIG. 2, and then deleting arcs 852, 854, 855 and 857 and nodes 803, 804, 805, 806, 807 and 808 in accordance with box 260 of FIG. 2. The remaining nodes are 801, 802, 811, 812, 809 and 810. The remaining arcs are 851, 859, 860, 861 and 858.

Figure 9:
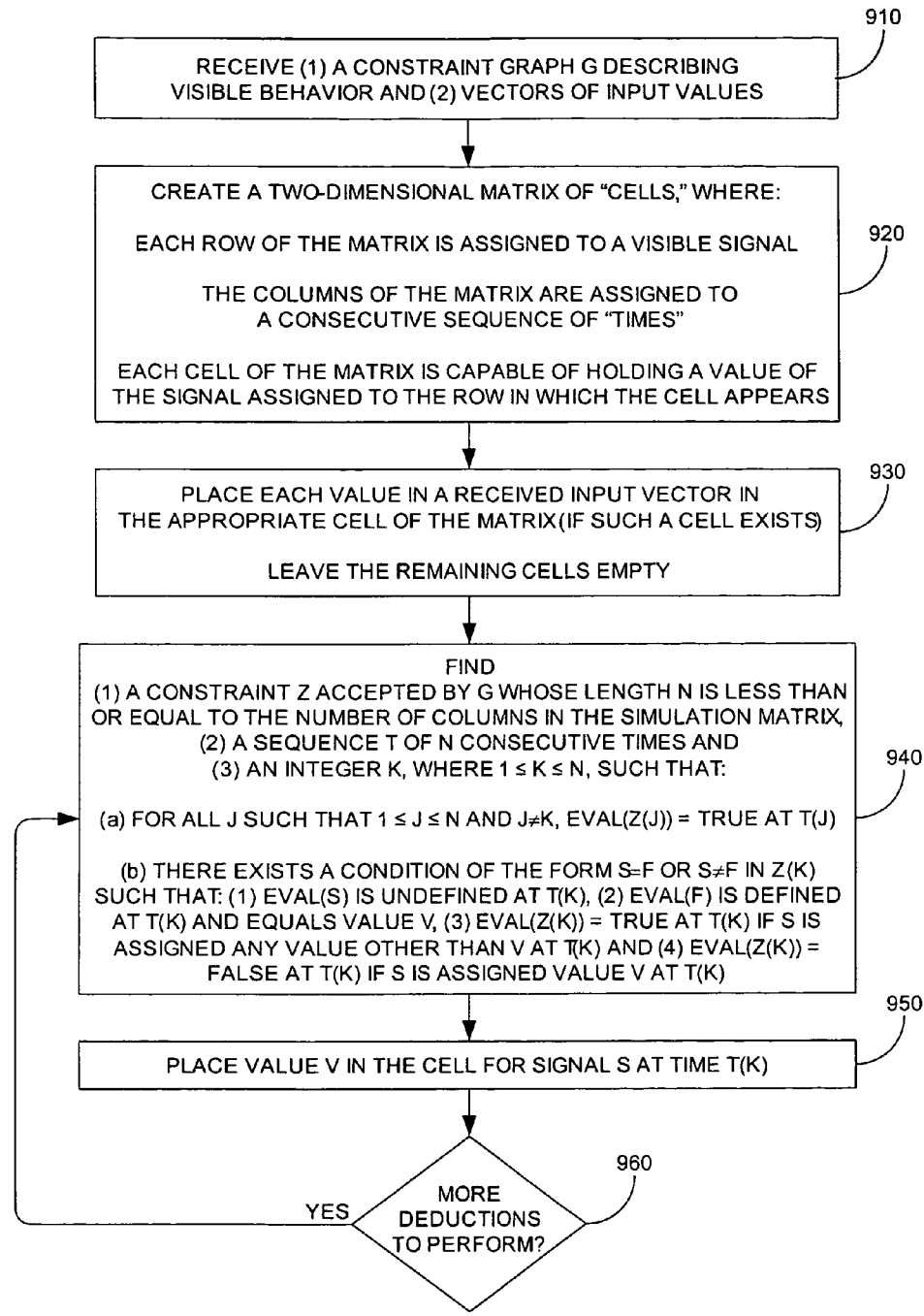
FIG. 9 is a flow chart showing generally the operations associated with "deducing" values in the constraint-based simulator according to an embodiment of the present invention.

FIG. 9 is a flow chart showing generally the operations associated with "deducing" values in the constraint-based simulator. At box 910, the procedure receives (1) a constraint graph G describing the visible behavior of a system and (2) vectors of input values. At box 920, the procedure creates a two-dimensional matrix of "cells," where: (1) each row of the matrix is assigned to a visible signal, (2) the columns of the matrix are assigned to a consecutive sequence of "times" and (3) each cell of the matrix is capable of holding a value of the signal assigned to the row in which the cell appears. At box 930, the procedure places each value in a received input vector into the appropriate cell of the matrix—if such a cell exists. The cells that are not assigned a value in this operation are left empty, and the value assigned to the cell is undefined.

At box 940, the procedure finds (1) a constraint Z that is accepted by G and whose length N is less than or equal to the number of columns (times) in the simulation matrix created in box 920, (2) a sequence T of N consecutive times and (3) an integer K, where $1 \leq K \leq N$, such that: (a) for all integers J such that $1 \leq K \leq N$ and $J \neq K$, Eval(Z(J))=True at time T(J), where "Eval" is as defined in FIG. 10, Z(J) is the J'th Boolean formula of Z and T(J) is the J'th time of T; (b) there exists a condition of the form S=F or S≠F in Z(K)—where S is a signal and F is a formula (Boolean or otherwise)—such that: (1) Eval(S) is undefined at time T(K), (2) Eval(F) is defined at time T(K) and equals value V, (3) Eval(Z(K))=True at time T(K) if S is assigned any value other than V at time T(K) and (4) Eval(Z(K))=False at time T(K) if S is assigned value V at time T(K). Thus all the Boolean formulas of Z "evaluate" to True if S is assigned any value other than V at time T(K). But the formulas of Z cannot all "evaluate" to True because Z is a constraint, and a constraint represents a disallowed (prohibited/forbidden/impossible) pattern of behavior. Therefore, Eval(Z(K)) must "evaluate" to False, and S must be assigned value V at time T(K). Accordingly, at box 950, the procedure places value V in the cell associated with signal S and time T(K). At box 960, control returns to box 940 if there are additional "deductions" to be performed.

Figure 10:
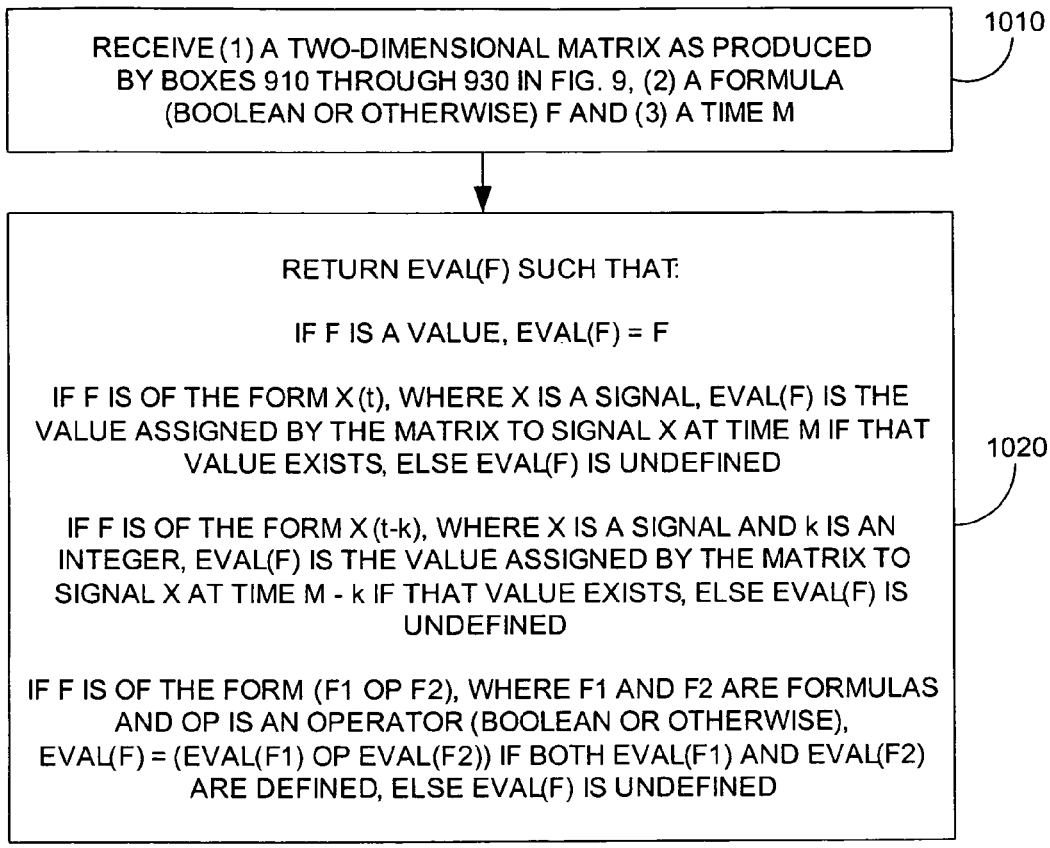
FIG. 10 is a flow chart showing generally the operations associated with "evaluating" a formula F at time M in the context of a simulation according to an embodiment of the present invention.

FIG. 10 is a flow chart showing generally the operations associated with "evaluating" a formula F at time M in the context of a simulation. At box 1010, the procedure receives. (1) a two-dimensional matrix as produced by boxes 910 through 930 in FIG. 9, (2) a formula (Boolean or otherwise) F and (3) a time M. At box 1020, the procedure returns Eval(F) such that: (a) If F is a value, Eval(F)=F; (b) If F is of the form X(t), where X is a signal, Eval(F) is the value assigned by the matrix to signal X at time M if that value exists, else Eval(F) is undefined; (c) If F is of the form X(t−k), where X is a signal and k is an integer, Eval(F) is the value assigned by the matrix to signal X at time M−k if that value exists, else Eval(F) is undefined. If F is of the form (F1 OP F2), where F1 and F2 are formulas and OP is an operator (Boolean or otherwise), Eval (F)=(Eval(FI) OP Eval(F2)) if both Eval(F1) and Eval(F2) are defined, else Eval(F) is undefined.

Figure 11A:
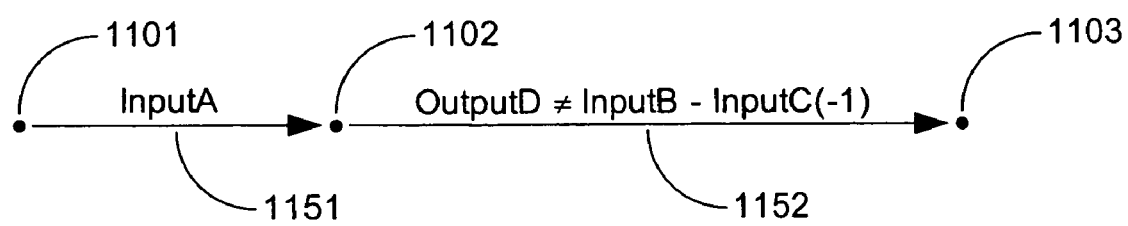
FIG. 11(a) depicts an illustrative "visible" constraint graph G according to an embodiment of the present invention.

FIG. 11(*a*) depicts an illustrative "visible" constraint graph G with initial node 1101, terminal (or accepting) node 1103, internal node 1102 and arcs 1151 and 1152. G accepts just a single constraint:

<Input*A*, (Output*D*≠Input*B*−Input*C*(−1))> where InputA is a Boolean signal and InputB, InputC and OutputD are integer signals.

FIG. 11(*b*) depicts an illustrative initial matrix (simulation) created from constraint graph G of FIG. 11(*a*) and a set of input vectors in accordance with boxes 910 through 930 of FIG. 9. The matrix comprises rows 1201 through 1204, columns 1211 through 1216 and cells 1251 through 1274. In accordance with box 920 of FIG. 9, each row of the matrix is assigned to a visible signal, and the columns of the matrix are assigned to a consecutive sequence of times. In accordance with box 930 of FIG. 9, cells 1251 through 1268 receive values from the set of input vectors received at box 910. Also in accordance with box 930 of FIG. 9, cells 1269 through 1274 are initially left empty.

In accordance with box 940 of FIG. 9, a first deduction is performed by first setting the constraint Z referenced in box 940 to the constraint <Input*A*, (Output*D*≠Input*B*−Input*C*(−1))> accepted by G, by setting the sequence of times T referenced in box 940 to

<time=0, time=1> and by setting the K referenced in box 940 to 2. We then observe that Z(1) is the Boolean formula InputA and T(1) is time=0. Eval(Z(1)) is thus the value of InputA at time=0, which is the value True appearing in cell 1251. We then observe that Z(2) is the Boolean formula (OutputD≠InputB−InputC(−1)) and that T(2) is time=1. We observe further that Z(2) contains the condition C=(OutputD≠InputB−InputC(−1)) and that because cell 1270 is undefined (empty), Eval(OutputD) at time=1 is undefined. Moreover, because cell 1258 contains the value −5, Eval(InputB) at time=1 is the value −5; and because cell 1263 contains the value −9, Eval (InputC(−1)) at time=1 is the value −9. Therefore, Eval(Input*B*−Input*C*(−1))=Eval(Input*B*)−Eval(Input*C* (−1))=−5−(−9)=4 at time=1

Finally, we observe that Eval(Z(2))=True at time=1 if OutputD is assigned any value other than 4 at time=1 and that Eval(Z(2))=False at time=1 if OutputD is assigned value 4 at time=1. In accordance with boxes 940 and 950 of FIG. 9, value 4 is placed in cell 1270, which is the cell that holds the value of signal OutputD at time=1.

FIG. 11(*c*) depicts an illustrative final matrix (simulation) derived from constraint graph G of FIG. 11(*a*) and the illustrative initial matrix (simulation) of FIG. 11(*b*) using the procedure of FIG. 9. In this final matrix, cells 1270, 1272 and 1273 contain deduced values.

As described in boxes 150 and 160 of FIG. 1, each of cells 1270, 1272 and 1273 may be "queried" by the user to determine the "cause" of the deduced value. In response to such a query, the simulator returns to the user the constraint, or constraints, and the input values used to calculate the deduced value. For example, if the user should query cell 1270 in the simulation of FIG. 11(*c*), the simulator returns to the user the constraint <Input*A*, (Output*D*≠Input*B*−Input*C*(−1))> and "matches" the signal InputA in position 1 of the constraint to the value True in cell 1251 of the simulation, "matches" the signal InputB in position 2 of the constraint to the value −5 in cell 1258 of the simulation and "matches" the signal InputC(−1) in position 2 of the constraint to the value −9 in cell 1263 of the simulation. The response to the user also indicates that the condition (OutputD≠InputB−InputC(−1)) in position 2 of the constraint is the condition used to make the deduction.

Other Embodiments

In the foregoing specification, embodiments of the invention have been described with reference to numerous specific details that may vary from implementation to implementation. For example, although the resolution phase of the preferred embodiment entails labeling each node of a constraint graph with an ordered pair <aft,fore> where aft and fore are each a set of sets of node names, there is another embodiment in which either the "aft" member or the "fore" member of these ordered pairs is eliminated—along with the operations performed on that deleted member—so that each node is then labeled with a single set of sets, and the Sum and Product operations are performed on just that set of sets.

Moreover, there is an embodiment in which each set of sets of node names is replaced by a Boolean "sum of products" of node names, with the Sum operation on sets of sets replaced by Boolean disjunction (OR) and the Product operation on sets of sets replaced by Boolean conjunction (AND). Furthermore, these Boolean sums of products can be "minimized" using "Boolean minimization" techniques that are well known in the prior art. And, of course, these same Boolean minimization techniques can be applied to the Boolean formulas labeling the arcs of a constraint graph. Without limitation, these and other variations are considered to fall within the scope of an embodiment of the present invention. Accordingly, it will be seen that an embodiment of the present invention provides a system and method for verifying system behaviors using constraint calculus analysis.

Hardware Overview

Figure 12:
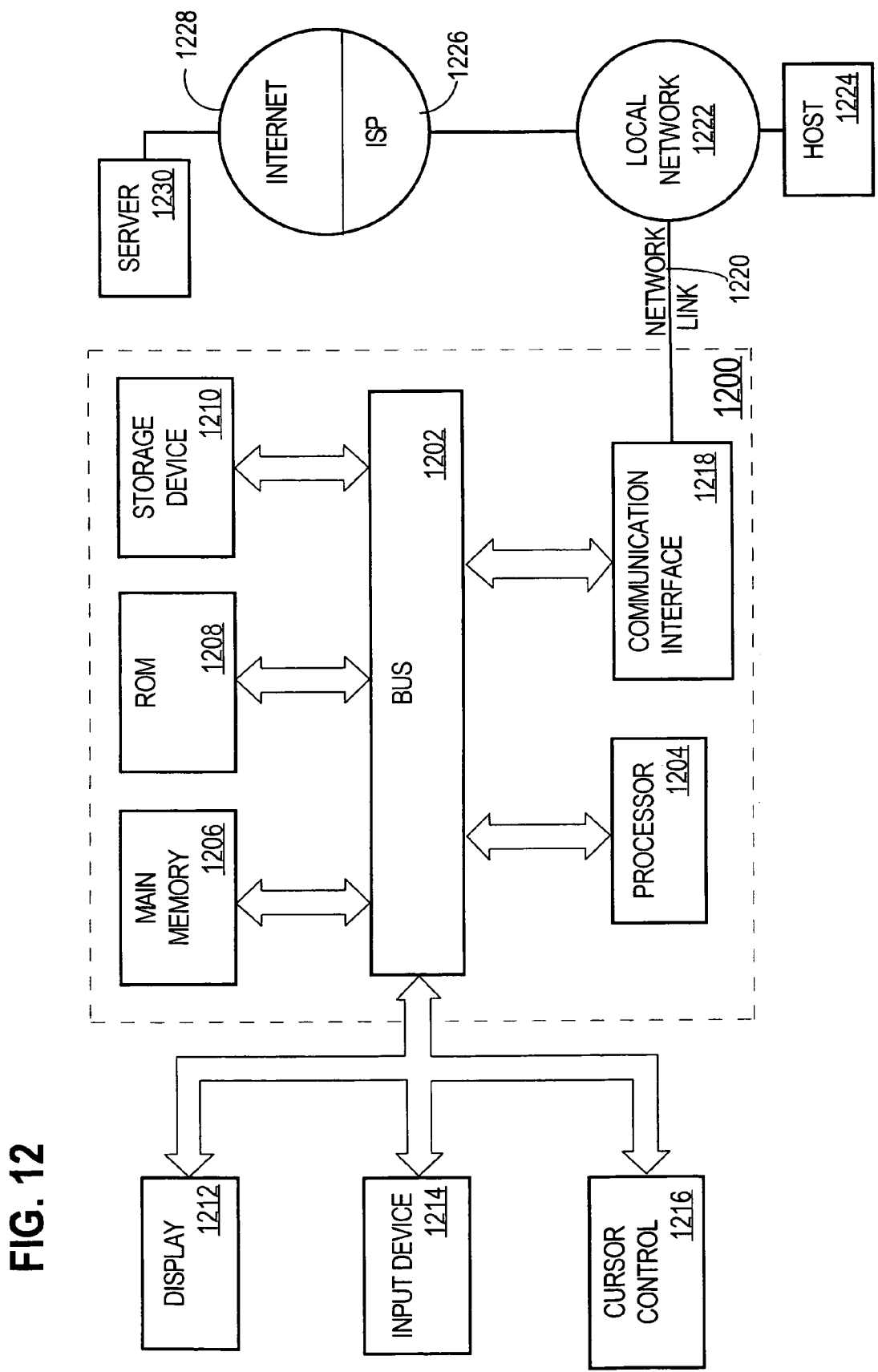
FIG. 12 is a diagram of a computer system that may be used in an implementation of an embodiment of the present invention.

FIG. 12 is a block diagram that illustrates a computer system 1200 upon which an embodiment of the invention may be implemented. Computer system 1200 includes a bus 1202 or other communication mechanism for communicating information, and a processor 1204 coupled with bus 1202 for processing information. Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

An embodiment invention is related to the use of computer system 1200 for implementing the techniques described herein. According to one embodiment of the invention, those techniques are performed by computer system 1200 in response to processor 1204 executing one or more sequences of one or more instructions contained in main memory 1206. Such instructions may be read into main memory 1206 from another machine-readable medium, such as storage device 1210. Execution of the sequences of instructions contained in main memory 1206 causes processor 1204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1200, various machine-readable media are involved, for example, in providing instructions to processor 1204 for execution. Such a medium may take many forms, including but not limited to, non-volatile media, and volatile media. Non-volatile media includes, for example, optical or magnetic disks, such as storage device 1210. Volatile media includes dynamic memory, such as main memory 1206. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are exemplary forms of carrier waves transporting the information.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution. In this manner, computer system 1200 may obtain application code in the form of a carrier wave.

Although the description above contains many specific examples, these should not be construed as limiting the scope of the invention but as merely providing an illustration of an embodiment of the invention. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for verifying the behavior of a digital system, said method comprising, receiving a constraint graph with directed arcs, each said directed arc being labeled with a Boolean formula, said constraint graph having at least one accepted path, each accepted path in said constraint graph being labeled with a sequence of Boolean formulas describing a disallowed pattern of behavior of said digital system;

receiving a list of non-visible signals;

starting with said constraint graph, performing for each non-visible signal in the list of non-visible signals:
  (a) performing either (a1) all possible resolutions of equal-length directed paths within the constraint graph of said non-visible signal or (a2) selected resolutions of equal-length directed paths within the constraint graph of said non-visible signal;
  (b) deleting all arcs in a resulting constraint graph that are labeled with a Boolean formula that mentions said non-visible signal;
  (c) deleting all arcs in the resulting constraint graph that are no longer on a directed path from an original initial node of the constraint graph to an original terminal node of the constraint graph;

supplying the resulting constraint graph to a constraint-based simulator;

supplying input values to said constraint-based simulator;

using said input values and constraints accepted by said constraint graph to calculate output values;

responding to a user query about a particular output value by determining the input values and the constraint, or constraints, used to calculate said output value; and supplying to the user said input values and said constraint, or constraints.

2. A computer-implemented method for verifying the behavior of a digital system, comprising:
  a constraint-based inference engine receiving logical/temporal/data dependencies describing the behavior of a digital system;
  deriving new logical/temporal/data dependencies describing the input/output behavior of the digital system; and
  wherein said logical/temporal/data dependencies received by and derived by said inference engine are in the form of a directed graph in which each arc is labeled with a Boolean formula.

3. The method of claim 2 wherein said method labels each node of said received directed graph, or a copy thereof, with a data structure.

4. The method of claim 3 wherein a new directed graph with labeled nodes and arcs is obtained from an existing directed graph with labeled nodes and arcs by resolution comprising the following steps:
  (a) deriving from equal-length directed paths in said existing directed graph a new directed path that is the same length as said equal-length paths such that the Boolean formula labeling the i'th arc of this new path is obtained from the Boolean formulas labeling the i'th arcs of said equal-length paths and the data structure labeling the i'th node of this new path is obtained from the data structures labeling the i'th nodes of said equal-length paths;
  (b) adding the nodes and arcs of the derived path to the existing directed graph.

5. The computer-implemented method of claim 4 wherein said resolution is via a selected signal S in a selected position k of said equal-length paths.

6. The computer-implemented method of claim 5, comprising the following steps for a system signal S:
  (6a) performing selected resolutions via said signal S;
  (6b) deleting all arcs labeled with a Boolean formula in which signal S appears;
  (6c) deleting all nodes and arcs not lying on a directed path from an initial node of the original directed graph prior to Steps (6a) and (6b) to a terminal node of the original directed graph prior to Steps (6a) and (6b).

7. The computer-implemented method of claim 6 in which the steps (6a), (6b), and (6c) are repeated for each non-input, non-output signal S.

8. The computer-implemented method of claim 4 in which said method labels each said node with a set of sets of node names of the original received directed graph.

9. The computer-implemented method of claim 4 wherein said method labels each said node with an ordered pairs <aft, fore> where aft and fore are each a set of sets of node names of the original received directed graph.

10. The computer-implemented method of claim 9 wherein said method labels the nodes of said received constraint graph, or a copy thereof, as follows:
  (a) each initial node is labeled with the ordered pair $<\{\ \}, \{\{\ \}\}>$;
  (b) each internal node N is labeled with the ordered pair $<\{\{N\}\}, \{\{N\}\}>$;
  (c) each terminal node is labeled with the ordered pair $<\{\{\ \}\}, \{\ \}>$.

11. A computer-implemented method comprising:
  a constraint-based simulator receiving
    (a) logical/temporal/data dependencies describing the input/output behavior of a digital system,
    (b) values for various input signals at various simulation times; and
  said constraint-based simulator determining values for various output signals at various simulation times using said logical/temporal/data dependencies.

12. The computer-implemented method of claim 11 wherein said received logical/temporal/data dependencies are in the form of a constraint graph.

13. The computer-implemented method of claim 12 wherein said values for various input signals and said values for various output signals are displayed in a two-dimensional tabular form wherein signals are associated with one dimension and simulation times are associated with the other dimension.

14. A computer-implemented method for simulating the behavior of a digital system comprising:
  receiving a constraint graph with directed arcs in which each said directed arc is labeled with a Boolean formula, said constraint graph having at least one accepted path, each accepted path in said constraint graph being labeled with a sequence of Boolean formulas describing a disallowed pattern of behavior of a digital system;
  receiving values for selected input signals;
  using said input values and constraints accepted by said constraint graph to calculate values for selected output signals at various simulation times.

15. The computer-implemented method of claim 14, further comprising:
  responding to a user query about a particular output value by determining the input values and the constraint, or constraints, used to calculate said output value;
  supplying to the user said input values and said constraint, or constraints, in at least one of several alternate formats.

* * * * *